United States Patent [19]

Haschke et al.

[11] 3,987,218

[45] Oct. 19, 1976

[54] PROCESS FOR DECREASING THE HYGROSCOPICITY OF POLYCARBOXYLATES

[75] Inventors: Heinz Haschke; Gerhard Morlock; Peter Kuzel, all of Grossauheim; Horst Krüger, Darmstadt, all of Germany

[73] Assignee: Deutsche Gold- und Silber-Scheideanstalt vormals Roessler, Frankfurt am Main, Germany

[22] Filed: June 11, 1974

[21] Appl. No.: 478,425

[30] Foreign Application Priority Data

June 18, 1973 Germany........................ 2330919

[52] U.S. Cl............................ 427/222; 427/240; 428/407
[51] Int. Cl.² ........................................ B05D 7/00
[58] Field of Search............. 117/100 C; 427/222, 427/240; 260/18 R, 23 AR; 424/38; 428/407

[56] References Cited

UNITED STATES PATENTS

| | | | |
|---|---|---|---|
| 3,247,065 | 4/1966 | Koff.................................. | 424/38 |
| 3,463,751 | 8/1969 | Hasegawa et al. .............. | 260/23 AR |
| 3,547,851 | 12/1970 | Frauenglass..................... | 260/23 AR |
| 3,584,114 | 6/1971 | Cavalli et al..................... | 424/38 |
| 3,591,409 | 7/1971 | Aubrey et al. ................... | 117/100 C |
| 3,619,266 | 11/1971 | Weissermel et al............. | 117/100 C |
| 3,619,267 | 11/1971 | Weissermel et al............. | 117/100 C |
| 3,661,810 | 5/1972 | Gahmig............................ | 117/100 C |
| 3,687,699 | 8/1972 | Prosser et al. .................. | 117/100 C |
| 3,779,785 | 12/1973 | Stiles et al....................... | 117/100 C |
| 3,798,338 | 3/1974 | Galle................................ | 424/38 |
| 3,830,750 | 8/1974 | Wellman.......................... | 117/100 C |

FOREIGN PATENTS OR APPLICATIONS

| | | | |
|---|---|---|---|
| 735,533 | 5/1966 | Canada............................ | 117/100 C |
| 1,105,680 | 3/1968 | United Kingdom.............. | 427/222 |

*Primary Examiner*—Ronald H. Smith
*Assistant Examiner*—Dennis C. Konopacki
*Attorney, Agent, or Firm*—Beveridge, DeGrandi, Kline & Lunsford

[57] ABSTRACT

A process for decreasing the hygroscopicity of a polycarboxylate, said process comprising preparing a melt of a composition having a melting point of about 40° – 120° C, said composition giving an acid or neutral pH in an aqueous solution or suspension, said composition being less hygroscopic than said polycarboxylate, said composition capable of being free flowing under equilibrium conditions at about 30° C and in an air atmosphere of at least about 40% relative humidity; heating said melt in a mixer to a temperature of up to about 140° C; gradually adding said polycarboxylate as a powder to said melt while mixing said melt; wherein said composition comprises at least about 3 and at most about 40% by weight of the mixture resulting after all polycarboxylate has been added to said melt.

8 Claims, No Drawings

PROCESS FOR DECREASING THE HYGROSCOPICITY OF POLYCARBOXYLATES

BACKGROUND OF THE INVENTION

1. Field of the Invention

This invention relates to a process for decreasing the hygroscopicity of polycarboxylates and to the improvement of the fluidity of polycarboxylates.

2. Description of the Prior Art

Polycarboxylates used as polyelectrolytes are polymers whose characteristics are determined essentially by the presence of numerous carboxyl or carboxylate groups. Polycarboxylates are known to have a more or less strong tendency to adsorb water vapor from the air. This characteristic is particularly evident in polyelectrolytes in the form of alkali metal or ammonium salts. Under certain circumstances, this tendency to absorb water vapor is so strong that these substances are inclined to lump very quickly, become sticky or even to deliquesce. These phenomena even can occur when the substances are in an atmosphere of relatively low temperature, for example 20° C, and relatively low relative humidity, for example 40 to 60%.

In order to decrease the hygroscopic characteristics of such polycarboxylates, it is known in the art to use the acid forms, that is, the free polycarboxylic acids, which are generally essentially less hygroscopic than the salts. For example, German published application No. 2,100,500 discloses a process for decreasing the hygroscopicity of polycarboxylates by a special production process; the polycarboxylates are produced by only partially neutralizing polycarboxylic acids with alkalis up to a neutralization degree of a maximum of 60%.

Other known processes for decreasing the undesirable consequences of hygroscopicity of polycarboxylates involve the use of waterproofed, finely dispersed silicic acids which keep the hygroscopic powder capable of flowing. (see for example German OS No. 2,134,695).

It is also known that the hygroscopicity of certain substances can be eliminated by encapsulating them in suitable casing materials or by subjecting them to a "microscopically" operative coating process, in analogy to "macroscopical" processes. The so-called "Prill process" is a particularly easy, modern coating technique. In that case, the hygroscopic substance is added as a powder to a melt of the casing material until a highly concentrated, fluid suspension of the hygroscopic substance forms, which is still sprayable through nozzles. This suspension is subsequently sprayed through spraying nozzles into a spray column, whereby the casing material still in a fluid state forms an almost precisely sperical casing around the powder particles of hygroscopic substance in each sprayed suspension droplet. While falling through the spray column, the sprayed droplets cool to such an extent that the casing material solidifies. Finally, a powder of spherical particles is obtained on the bottom of the column. This process has the disadvantage that relatively large quantities of casing material relative to the substance to be encased are required. For example, at least about 1 part by weight of casing material is employed for each 1 part by weight of substance to be encased. This is necessary in order to insure the fluidity of the suspension, its sprayability and the development of spherical particles.

Generally, processes for mixing hygroscopic substances with solid or fluid non-hygroscopic substances in different mixing systems, on the other hand, lead only to a decrease of hygroscopicity corresponding to the mixing ratio. There is no decisive influence on the characteristics of the hygroscopic substance (the decrease in hygroscopicity is expressed as a decrease of the volume of water absorbed at a certain temperature and at a certain relative humidity of air by the weight of the hygroscopic substance or of the mixture within a certain period). In accordance with the "snowballing" principle, every such mixing process will generally lead to a more or less quick agglomeration of the powder particles while forming crumbs up to a few centimeters, which are screened out or ground up after the mixing process.

Thus, there exists a need in the art for a process for decreasing the hygroscopicity of polycarboxylates. The process should be one in which a casing material is employed. Furthermore, the amount of casing material employed to obtain products of decreased hygroscopicity should be less than that required in prior art processes. The process should yield freely flowing, products.

SUMMARY OF THE INVENTION

Accordingly, this invention aids in overcoming the problems encountered in prior art processes by providing a process for decreasing the hygroscopicity of polycarboxylates. The process of this invention comprises preparing a melt of a composition having a melting point of about 40°– 100° C. The composition is capable of giving an acid or neutral pH in an aqueous solution or suspension. Also, the composition is less hygroscopic than the polycarboxylate to be treated. Additionally, the composition is capable of being freely flowing at about 30° C under equilibrium conditions in an air-like atmosphere of at least about 40% relative humidity. The melt is heated in a mixer to a temperature of up to about 140° C. The polycarboxylate is gradually added as a powder to the melt while mixing the melt. The amount of the composition is such that it comprises at least about 3 and at most about 40% by weight of the mixture resulting after all polycarboxylate has been added to the melt.

Surprisingly, during the treatment of polycarboxylates according to the process of this invention no lumps form during the mixing process. A considerable improvement in hygroscopic characteristics will already have been achieved with coating agent quantities, which are far below those of known coating processes, although the method of operation is as simple as possible. In view of the small effective quantities of coating agents it is doubtful whether the effect to be achieved rests at all or overwhelmingly on a real coating. The expression "coating agent", therefore, is used only as a simplification. Beyond that the coated product is obtained as a very uniform, free flowing granulate.

DESCRIPTION OF PREFERRED EMBODIMENT

The process of this invention can be used basically for the decrease of the hygroscopicity of all polycarboxylates. The achievable effect is particularly great, however, in case of treatment of partial or complete alkali metal or ammonium salts. In the present application we understand by polycarboxylates such polymer electrolytes, which have a multiplicity of carboxyl or carboxylate groups as functional groups. Examples of such polycarboxylates are polyacrylates, poly ($\alpha$ - hydroxyacrylates), homo- or copolymerizates of maleic acid or itaconic acid or the corresponding salts.

The process of this invention is used with a special advantage in case of a very definite group of polycarboxylates which contain carbonyl and/or hydroxyl groups as functional groups beside overwhelmingly carboxyl or carboxylate groups. The polycarboxylates are called poly (aldehydo-carboxylates)—for short PAC—, poly (hydroxy carboxylates)—for short POC— or poly (hydroxy aldehydo carboxylates)—for short PAC or POC depending on their overwhelming character, and depending on which of the above mentioned groups they contain in what proportion. The average degree of polymerization of the most important representatives is between about 5 and about 500, preferably about 10 and about 300, especially between about 15 and about 100. At the same time, the data concerning the average degree of polymerization are to be interpreted in such a way, that their values of 5, 10, 15, 100, 300 or 500, correspond to values of the reduced viscosity measured in 1% solutions of free poly (aldehydo carboxylic acids), or, for the poly (hydroxycarboxylates) and poly (hydroxyaldehydo carboxylates) measured in 1% solutions of the very poly (aldehydo carboxylic acids) constituting the basis as intermediate products of the former, of 0.033, 0.047, 0.053, 0.095, 0.200 or 0.300 deciliter/gram, whereby for the preparation of the 1% poly (aldehydo carboxylic acids) necessary for the measurement first the corresponding quantities of 5% aqueous $SO_2$ solutions must first be poured over the free poly (aldehydo carboxylic acids) and, after complete solution has occurred one refills with the same volume of 10% aqueous NaCl solution. The viscosimetric measurement is made at 20° C.

The preferred polycarboxylates are built up from: Y + W/2 basic mole percent of units of the formula (I)

$$\left[ -CH_2-\underset{\underset{COOA}{|}}{\overset{\overset{R_1}{|}}{C}}- \right]$$

U − W basic mole percent of units of the formula (II)

$$\left[ -CH_2-\underset{\underset{CHO}{|}}{\overset{\overset{R_2}{|}}{C}}- \right]$$

Z basic mole percent of units of the formula (III)

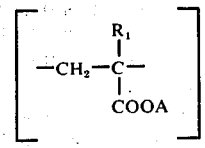

W/2 basic mole percent of units of the formula (IV)

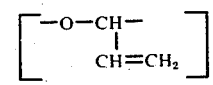

and
V basic mole percent of units of the formula (V)

$$\left[ -O-\underset{\underset{CH=CH_2}{|}}{CH}- \right]$$

whereby U equals 12 to 47, preferably 10 to 30; V equals 1 to 25, preferably 1 to 15, especially 1 to 10; W equals O to U, preferably 0.3 · U to U, especially 0.5 · U to U; Y equals 100 − (U + V + Z); and Z equals 0 to 20, preferably 0 to 10, especially 0; A stands for an alkali metal, hydrogen or ammonium ion, preferably a sodium or hydrogen ion; $R_1$ signifies hydrogen, methyl, hydroxymethyl, ethyl, chlorine or bromine, preferably hydrogen or hydroxy methyl: $R_2$ and $R_4$ are the same or different and signify hydrogen or hydroxymethyl; $R_3$ and $R_5$ are equal or different and signify hydrogen, methyl or ethyl, preferably hydrogen; and whereby it must be fulfilled as a marginal condition, that for W unequal to zero, the quotient of basic mole percent carboxyl or carboxylate groups to basic mole percent hydroxyl groups lies between about 2 and about 16, preferably between 2 and 9, especially between 3 and 8.

The proportions of the units are stated in the general formulas (I) to (V) in basic mole percent according to E. Trommstorff, i.e., as the average number of the pertinent formula units per altogether 100 formula units (I) to (V) in the polymer molecule.

The previously defined poly (aldehydo carboxylates), poly-(hydroxycarboxylates) and poly (hydroxy aldehydo carboxylates) as well as suitable processes for their production, are described in detail in the following German applications open to public inspection: German application Nos. 1,904,940, 1,904,941 and 1,942,556. Among others, they are eminently suitable as complexing agents for water hardening substances or for ions of heavy metals, and as builders for detergents, bleaches and cleaners. However, in special cases of application their hygroscopicity may possibly have a disturbing effect. As a result of the process of this invention, this hygroscopicity may be reduced considerably, so that they can also be used for such purposes, without there being any need to fear breakdowns.

The polycarboxylates, particularly in the form of their partial or complete salts, which are to be treated according to the process of this invention, are added as a ground, or spray-dried powder slowly, i.e., at about such a speed that according to visual evaluation, a complete homogenization of the mixing substance will always take place within a few minutes, for example, 5 to 10 minutes, to the melt of the coating agent, located in a running blender heated to a temperature up to 140° C. It will be understood that polycarboxylates can be added in a slow, continuous manner or in discrete portions.

Naturally, as coating agents only such substances come into question, which are less hygroscopic than the polycarboxylates to be treated. They are to remain easily fluid, therefore, "free flowing", after establishment of equilibrium at 30° C in an air-atmosphere of 40%, preferably at least 80%, especially at least 90% relative humidity.

The coating agents must furthermore react acidly or neutrally in an aqueous solution or suspension. Unexpectedly, basic substances, such as hexamethylene diamine, are completely unsuitable because they lead to complete gluing together of the mixing substance in the blender and to the formation of lumps.

The melting point of the coating agents is to be in the area between about 40° and about 120° C, preferably between about 50° and about 100° C, especially between about 60° and about 80° C, and their quantity is to be regulated such that their proportion, after addition of the entire quantity of polycarboxylate to be treated, amounts to about 3 to about 40% by weight, preferably about 5 to about 30% by weight, especially about 5 to about 15% by weight of the resulting mixture.

Aliphatic monocarboxylic acids from about $C_{12}$, such as lauric acid, myristic acid, palmitic acid, stearic acid, arachic acid, behenic acid, elaidic acid; aliphatic dicarboxylic acids, such as glutaric acid, pimelic acid or undecandic carboxylic acid; acid anhydrides, such as maleic acid anhydride; monovalent alcohols, such as cetyl, ceryl alcohol, eicosanol, psyllostearyl alcohol, or poly (vinyl alcohols); paraffin; esters, such as fatty acid esters of higher monovalent alcohols (for example, "Japan wax"); fatty acid-polyglycol ether; polyether, such as propylene oxide - ethyleneoxide - copoly addition products are suitable, for example, as coating agents, which fulfill the above mentioned conditions. The aliphatic $C_{16}$ to $C_{22}$ monocarboxylic acids and poly (vinyl alcohols) are particularly preferred. Mixtures of two or more coating agents can also be used, whenever the mixtures fulfill the above mentioned conditions. In that case, coating agents, which in their pure state have melting points above about 120° C can also be used, whenever their mixtures will melt below about 120° C as a result of the effect of the "depression of the freezing-point."

For the optimum utilization of the effect that can be achieved by the process of the invention it will be advantageous after complete addition of the polycarboxylate to the coating agent supplied to the blender and after a complete visual homogenization of the mixture, to remix for some time yet, i.e., about 10 minutes to about 1 hour, at a temperature between about 40 and about 140° C, preferably between the melting point of the coating agent and about 140° C.

Only systems that can be heated to the above-mentioned temperatures, and which do not put a high mechanical strain on the mixing substance, i.e., permit the build-up of large aggregations of particles and will not lead to an excessive grinding (i.e., to an essential reduction of the average grain size of the powders used) are suitable as mixers. Only blenders, therefore, without special crushing mechanisms are employed (cf. Ullmann's Encyclopedia of Chemical Engineering, 3rd ed. vol. 1, p. 714). To these belong blending drums; blenders with rotating vanes; stirrers; possibly, whenever the construction excludes a pulverizing effect (i.e., a crushing of the mixing substance by crushing between the machine parts or shattering by machine parts); also screw mixers (cf. A. G. Kassatkin "Chemical Process Engineering," Vol. I, VEB, German Publishers for the basic material industry, Leipzig [1962] p. 329).

Examples of such mixers are gravity mixers with or without forced mixing process; plowshare-mixers; centrifugal mixers or conical screw or epi-cycloid screw mixers. Of these, the plowshare mixers with rigid or with rotating drum are particularly suitable for the process of this invention.

The entire duration of the mixing process in case of the process of this invention, counting from the time of the first addition of polycarboxylate to the mixer should be effectively between about 15 minutes and about 5 hours, preferably between about 20 minutes and about one hour.

In the following comparative experiments and examples the hygroscopicity and fluidity of the substance under examination is tested in the following manner:

Into cylindrical glass-weighing scales with a diameter of about 4 cm and a height (including ground point) of about 2 cm, powdery (average particle diameter around $70\mu$) samples of the substances to be tested are weighed in. The test portions are selected such that in case of a fairly even distribution of the powder over the bottom surface of the weighing scales, a height of coverage of about 3–5 mm will result.

Immediately after weighing in, the weighing scales with the samples are set in dessicator vessels over aqueous sulfuric acid. The sulfuric acid solutions in the dessicator vessels are adjusted such that a relative humidity of the air (related to 20° C) of 40% or of 65% or of 80% is maintained each time in a dessicator vessel (50% or 36% or 26% $H_2SO_4$).

At intervals, each time of 24 hours, the weighing scales with the powder samples are weighed, and thus the relative increase in weight (= water absorption) is found in percent of the starting weight. Before a reinsertion of the samples in the corresponding dessicator vessels, the powders are thoroughly mixed with a metal trowel, tested at the same time for their fluidity, and finally weighed once more for determination of the factor of correction for possible losses in powder as a result of the mixing process. The intermixing is accomplished, in order to avoid any possible impediment in the access of the atmospheric moisture to the lower powder layers through the upper powder layers.

The test results are given in percent of weight increase after 2 days at 40%, 65% or 80% relative humidity of the air ("rel hum"l 20° C) together with giving the fluidity limit (i.e., the necessary, percentual water absorption, possibly forced by essentially more drastic conditions, up to the beginning of becoming lumpy, therefore to the end of the free fluidity of the powder).

EXAMPLES

In the examples, the process of the invention is illustrated with the following pure poly (hydroxy carboxylates) and poly (hydroxy aldehydo carboxylates).

POC-Na salt "A"

POC-Na salt, produced by oxidative CO-polymerization of 20 mole percent acrylic acid with 80 mole percent of acrolein in 20% by weight aqueous $H_2O_2$ solution (0.9 mole $H_2O_2$ per mole acrolein) at 65° C, followed by neutralization, conversion with NaOH according to Cannizzaro and subsequent neutralization with a residual portion of the mentioned copolymerizate in 33% by weight aqueous solution to pH = 7.0.

The POC-Na salt is characterized by the parameters: average degree of polymerization = 12; $COO^-$: OH ratio = 3.2 (also taking into consideration the terminal groups); $U = 24.5$; $V = 11.0$; $W = 22.5$; $Y = 64.5$; $Z = 0$.

PAC-Na salt "B"

PAC-Na salt, produced by oxidative copolymerization of 50 mole percent acrolein and 50 mole percent acrylic acid in aqueous, 20% by weight $H_2O_2$ (0.9 moles $H_2O_2$ per mole acrolein), at about 60° C and subsequent neutralizaton with aqueous caustic soda solution in 30% aqueous solution to pH = 7; characterized by the parameters: average degree of polymerization = 60; $U = 18$; $V = 4$; $W = 3$; $Y = 78$; $Z = 0$.

POC-Na salt "C"

POC-Na salt, produced by oxidative copolymerization of 50 mole percent acrolein with 50 mole percent acrylic acid in 20% aqueous hydrogen peroxide (0.9 moles $H_2O_2$ per mole acrolein) at 60° C, followed by neutralization, Cannizzaro reaction and neutralization with 20% $H_2SO_2$ in 40% aqueous solution to pH = 7, characterized by the parameters: average degree of polymerization = 60, $COO^-$: OH ratio = 7.7 (considering the terminal groups); $U = 18$; $V = 4$; $W = 17.55$; $Y = 78$; $Z = 0$.

POC-Na salt "D"

POC-Na salt, produced by oxidative copolymerization of 50 mole percent acrolein with 50 mole percent acrylic acid in 20% aqueous $H_2O_2$ (0.9 mole $H_2O_2$ per mole acrolein) at 60° C, followed by neutralization and Cannizzaro rection in the presence of (i.e., with simultaneous condensation of) formaldehyde as well as subsequent neutralization to pH = 7 with a residual portion of the mentioned copolymerizate, produced in the first reaction step in 35% aqueous solution characterized by the parameters: average degree of polymerization = 60, $COO^-$: OH ratio = 5.8 (with due consideration of the terminal groups); $U = 16.7$, $V = 3.4$; $W = 80$; $U = 79.9$; $Z = 0$.

The testing of the hygroscopicity and fluidity of these polycarboxylates yields the following results, which are to serve as the basis for the evaluation of the effects achievable by the process of this invention:

| Product | Hygroscopicity, percent increase in weight after 2 days at | | | Fluidity limit at a percent increase in weight of: |
| --- | --- | --- | --- | --- |
| | 40% rel. hum. | 65% rel. hum. | 80% rel. hum. | |
| POC—Na "A" | 13 | 36 | 48 | 12 |
| POC—Na "B" | 7 | 20 | 25 | 15 |
| POC—Na "C" | 8 | 23 | 30 | 15 |
| POC—Na "D" | 9 | 27 | 33 | 15 |

Already after a few hours standing open at 65% relative atmospheric humidity (at 20° C) the free fluidity of these products is lost.

EXAMPLE 1

In a plowshare mixer with a horizontal, rigid mixing drum and 5 l capacity, heated to 60° C, 100 g lauric acid are melted. Over 30 minutes, 1900 g POC-Na salt "C" are added as a spray-dried powder with average particle diameter of about 50 $\mu$ (corresponding to 5% coating agent in the total mix). After completion of the POC addition, mixing is continued for another 15 minutes at 50° C. The suspension of the POC powder in the fatty acid melt formed at the beginning of the POC addition is suddenly transformed into a free flowing granulate after a part of the POC quantity (about 150 g) had been added and upon further POC addition, which granulate was maintained in fairly uniform outside appearance to the end of the POC addition and of the mixing process.

The product obtained represents a homogeneous granulate of about 70 $\mu$ average particle diameter, except for negligible attachments to walls and blades in the mixer. It is essentially more easily fluid than the starting product, and exhibits the following behavior in the hygroscopicity test:

| Percent increase in weight after 2 days at | | | |
| --- | --- | --- | --- |
| 40% rel. hum. | 65% rel. hum. | 80% rel. hum. | Fluidity limit |
| 7 | 14 | 16 | at 25% water absorption |

EXAMPLE 2

In a plowshare mixer with a horizontal, rigid mixing drum and 5 l capacity, heated to 100° C, 100 g of stearic acid are melted. Over 30 minutes, with the mixer running, 1900 g POC-Na salt "C" are added as a spray-dried powder with an average particle diameter of about 50 $\mu$ (corresponding to 5% coating agent in the total mix).

After completion of the POC addition, mixing is continued for another 15 minutes at 100° C. The suspension of the POC powder in the fatty acid melt formed at the beginning of the POC insertion, transformed suddenly into an easily fluid granulate after a part of the POC quantity (about 100 g) had been added and during further POC addition, which granulate was maintained with fairly uniform outside appearance to the end of the POC addition and of the mixing process.

The product obtained represents a homogeneous granulate of about 70 $\mu$ average particle diameter, except for a few neglibible attachments to wall and blades in the mixer.

After cooling to ambient temperature it is essentially more easily fluid than the starting product and it shows the following behavior in the hygroscopicity test:

| Percent increase in weight after 2 days at | | | |
| --- | --- | --- | --- |
| 40% rel. hum. | 65% rel. hum. | 80% rel. hum. | Fluidity limit |
| 7 | 16 | 17 | at 22% water absorption |

EXAMPLE 3

100 g stearic acid are melted in a plowshare mixer, heated to 100° C, with horizontal rigid mixing drum and 5 l capacity. With 20 minutes and with the mixer running, 1900 g PAC-Na salt "B" are added as a spray-dried powder with an average particle diameter of about 50 $\mu$ (corresponding to 5% coating agent in the total mix).

After completion of the PAC addition, mixing is continued for another 20 minutes at 100 °C. The suspension of the PAC powder in the fatty acid melt, formed at the beginning of the PAC insertion, and after a part of the PAC quantity (about 100 g) had been added, tipped over suddenly in case of further PAC addition into an easily fluid granulate, which was maintained in a fairly uniform external appearance to the end of the PAC addition and of the mixing process.

The product obtained represents a homogenous granulate of about 70 $\mu$ average particle diameter except for negligible attachments to the walls and blades in the mixer.

After cooling to ambient temperature this is considerably more readily fluid than the starting product, and exhibits the following behavior in the hygroscopicity test:

| Percent increase in weight after 2 days at | | | |
|---|---|---|---|
| 40% rel. hum. | 65% rel. hum. | 80% rel. hum. | Fluidity limit |
| 5 | 12 | 15 | at 28% water absorption |

EXAMPLE 4

100 g stearic acid are melted in a plowshare mixer with a horizontal rigid mixing drum and 5 l capacity and heated to 90° C. Within 25 minutes and with the mixer running, 1900 g POC-Na salt "A" are added to the melt as a finely ground powder with an average particle diameter of about 50 $\mu$ (corresponding to 5% coating agent in the total mix).

After completion of the POC addition, mixing is continued for yet another 15 minutes at 90° The suspension of the POC powder in the fatty acid melt forms at the beginning of the POC addition, and after a part of the POC quantity (about 100 g) had been added, the suspension is suddenly transformed into an easily fluid granulate upon further POC addition, which was maintained in a fairly uniform outside appearance up to the end of the POC addition and of the mixing process.

The product obtained represents a homogenous granulate of about 60 $\mu$ average particle diameter, except for negligible attachments to walls and blades in the mixer.

After cooling to ambient temperature this is essentially more easily fluid than the starting product, and it shows the following behavior in the hygroscopicity test:

| Percent increase in weight after 2 days at | | | |
|---|---|---|---|
| 40% rel. hum. | 65% rel. hum. | 80% rel. hum. | Fluidity limit |
| 9 | 19 | 20 | at 22% water absorption |

EXAMPLE 5

200 g of myristic acid are melted in a plowshare mixer with horizontal mixing drum and 5 l capacity and heated to 60° C. Within 20 minutes and with a running mixer, 1800 g of POC-Na salt "A" are added to the melt as a spray-dried powder with an average particle diameter of about 50 $\mu$ (corresponding to 10% coating agent in the total mix).

After completion of the POC addition, mixing is continued for yet another 20 minutes at 60° C. The suspension of the POC powder in the fatty acid melt at the beginning of the POC addition and after a part of the POC quantity (about 200 g) had been added, is suddenly transformed into an easily fluid granulate upon further POC addition, which is maintained in fairly uniform outside appearance up to the end of the POC addition and of the mixing process.

The product obtained represents a homogenous granulate of about 70 $\mu$ average diameter, except for negligible attachments (adhesions) to walls and blades in the mixer.

After cooling to ambient temperature this is essentially more easily fluid than the starting product, and shows the following behavior in the hygroscopicity test:

| Percent increase in weight after 2 days at | | | |
|---|---|---|---|
| 40% rel. hum. | 65% rel. hum. | 80% rel. hum. | Fluidity limit |
| 7 | 17 | 18 | at 25% water absorption |

EXAMPLE 6

300 g of palmitinic acid are melted in a plowshare mixer with horizontal rigid mixing drum and 5 l capacity, heated to 80° C. Within 35 minutes and with running mixer, 1700 g POC-Na salt "A" are added to the melt, as a spray-dried powder with average particle diameter of about 50 $\mu$ (corresponding to 15% coating agent in the total mix).

After completion of the POC addition, mixing is continued for yet another 15 minutes at 80° C. The suspension of the POC powder in the fatty acid melt, formed in the beginning of the POC insertion and after a part of the POC quantity (about 300 g) has been added, is suddenly transformed into an easily fluid granulate upon further POC addition, which is maintained in fairly uniform outside appearance up to the end of the POC addition and of the mixing process.

The product obtained represents a homogenous granulate of about 80 $\mu$ average particle diameter, except for negligible attachments on walls and blades in the mixer.

After cooling to ambient temperature it is essentially more easily fluid than the starting product, and shows the following behavior in the hygroscopicity test:

| Percent increase in weight after 2 days at | | | |
|---|---|---|---|
| 40% rel. hum. | 65% rel. hum. | 80% rel. hum. | Fluidity limit |
| 6 | 16 | 17 | at 25% water absorption |

EXAMPLE 7

400 g of behenic acid are melted in a plowshare mixer with horizontal rigid mixing drum and 5 l capacity, heated to 130° C. Within 50 minutes and with the mixer running, 1600 g POC-Na salt "A" are added to the melt as a spray-dried powder with an average particle diameter of about 50 μ (corresponding to 20% coating agent in the total mix).

After completion of the POC addition, mixing is continued for yet another 10 minutes at 120° C. The suspension of the POC powder in the fatty acid melt, formed at the beginning of the POC insertion and after a part of the POC quantity (about 400 g) had been added, transforms suddenly into an easily fluid granulate upon further POC addition, which is maintained at a fairly uniform outside appearance to the end of the POC addition and of the mixing process.

The product obtained represents a homogenous granulate of about 80 μ average particle diameter, except for negligible attachments to the walls and blades in the mixer.

After cooling to ambient temperature it is essentially more easily fluid than the starting product and shows the following behavior in the hygroscopicity test:

| Percent increase in weight after 2 days at | | | |
|---|---|---|---|
| 40% rel. hum. | 65% rel. hum. | 80% rel. hum. | Fluidity limit |
| 4.5 | 15 | 16 | at 25% water absorption | melt as a spray-dried powder with an average diameter of about 50 μ (corresponding to 28% coating agent in the total mix).

After completion of the POC addition, mixing is continued yet another 20 minutes at 90° C. The suspension of the POC powder in the fatty acid melt, formed at the beginning of the POC addition and after a part of the POC quantity (about 500 g) has been added, suddenly transforms into an easily fluid granulate in case of further addition of POC, which is maintained in fairly even outside appearance to the end of the POC addition and of the mixing process.

The product obtained represents a homogenous granulate of about 70 μ average particle diameter, except for negligible attachments to walls and blades in the mixer.

After cooling to ambient temperature, it is essentially more easily fluid than the starting product, and shows the following behavior in the hygroscopicity test:

| Percent increase in weight after 2 days at | | | |
|---|---|---|---|
| 40% rel. hum. | 65% rel. hum. | 80% rel. hum. | Fluidity limit |
| 2.5 | 10 | 14 | at 25% water absorption |

EXAMPLE 8

500 g of stearic acid are melted in a plowshare mixer with horizontal rigid mixing drum and 5 l capacity, heated to 90° C. Within 30 minutes and with the mixer running, 1500 g POC-Na salt "A" are added to the melt as a spray-dried powder with an average particle diameter of about 50 μ (corresponding to 25% coating agent in the total mix).

After completion of the POC addition, mixing is continued for yet another 15 minutes at 90° C. The suspension of the POC powder in the fatty acid melt, formed at the beginning of the POC insertion and after a part of the POC quantity (about 500 g) had been added suddenly transforms into an easily fluid granulate in case of further POC addition, which is maintained in a fairly uniform outside appearance to the end of the POC addition and of the mixing process.

The product obtained represents a homogenous granulate with an average particle diameter of about 80 μ, except for negligible attachments on walls and blades in the mixer.

After cooling to ambient temperature it is essentially more easily fluid than the starting product, and shows the following behavior in the hygroscopicity test:

| Percent increase in weight after 2 days at | | | |
|---|---|---|---|
| 40% rel. hum. | 65% rel. hum. | 80% rel. hum. | Fluidity limit |
| 3.5 | 13 | 15 | at 25% water absorption |

EXAMPLE 9

500 g stearic acid are melted in a plowshare mixer with horizontal rigid mixing drum and 5 l capacity, heated to 90° C. Within 20 minutes and with the mixer running, 1300 g of POC-Na salt "A" are added to the

EXAMPLE 10

200 g paraffin are melted in a plowshare mixer with horizontal rigid mixing drum and 5 l capacity, heated to 100° C. Within 40 minutes, and with the mixer running, 1800 g POC-Na salt "A" are added to the melt as a spray-dried powder with average particle diameter of about 50 μ (corresponding to 10% coating agent in the total mix).

After completion of the POC addition, mixing is continued yet another 20 minutes at 100° C. The suspension of the POC powder in the paraffin melt, formed at the beginning of the POC insertion and after a part of the POC quantity (about 100 g) has been added, suddenly transforms into an easily fluid granulate in case of further addition of POC, which is maintained in fairly even outside appearance to the end of the POC addition and of the mixing process.

The product obtained represents a homogenous granulate of about 70 μ average particle diameter, except for negligible attachments on walls and blades in the mixer.

After cooling to ambient temperature, it is essentially more easily fluid than the starting product, and shows the following behavior in the hygroscopicity test:

| Percent increase in weight after 2 days at | | | |
|---|---|---|---|
| 40% rel. hum. | 65% rel. hum. | 80% rel. hum. | Fluidity limit |
| 7 | 17 | 19 | at 25% water absorption |

EXAMPLE 11

300 g of maleic acid anhydride are melted in a plowshare mixer with a horizontal rigid mixing drum and 5 l capacity, heated to 100° C. Within 40 minutes and with the mixer running, 1700 g POC-Na salt "A" is added to the melt as a spray-dried powder with an average particle diameter of 50 μ (corresponding to 15% coating agent in the total mix).

After completion of the POC addition, mixing is continued for yet another 15 minutes at 100° C. The suspension of the POC powder in the maleic acid anhydride melt, formed at the beginning of the POC insertion and after a part of the POC quantity (about 300 g) has been added, suddenly transforms into an easily fluid granulate upon further POC addition, which is maintained in fairly even outside appearance to the end of the POC addition and of the mixing process.

The product obtained represents a homogenous granulate of about 80 μ average particle diameter, except for negligible attachments on walls and blades in the mixer.

After cooling to ambient temperature, it is essentially more easily fluid than the starting product, and shows the following behavior in the hygroscopicity test:

| Percent increase in weight after 2 days at | | | |
|---|---|---|---|
| 40% rel. hum. | 65% rel. hum. | 80% rel. hum. | Fluidity Limit |
| 9 | 20 | 23 | at 25% water absorption |

EXAMPLE 12

100 g of Japan wax are melted in a plowshare mixer with a horizontal rigid mixing drum and 5 l capacity, heated to 100° C. Within 30 minutes and with the mixer running, 1900 g POC-Na salt "A" are added to the mix as a spray-dried powder with average particle diameter of about 50 μ (corresponding to 5% coating agent in the total mix).

After completion of the POC addition, mixing is continued for yet another 15 minutes at 100° C. The suspension of the POC powder in the Japan wax melt, formed at the beginning of the POC addition and after a part of the POC quantity (about 100 g) has been added, is suddenly transformed into an easily running granulate upon further POC addition, which is maintained in fairly even external appearance up to the end of the POC addition and of the mixing process.

The product obtained represents a homogenous granulate of about 60 μ average particle diameter, except for negligible attachments on walls and blades in the mixer.

After cooling to ambient temperature it is essentially more easily fluid than the starting product, and shows the following behavior in the hygroscopicity test:

| Percent increase in weight after 2 days at | | | |
|---|---|---|---|
| 40% rel. hum. | 65% rel. hum. | 80% rel. hum. | Fluidity limit |
| 9.5 | 17 | 18 | at 20% water absorption |

EXAMPLE 13

200 g Japan wax are melted in a plowshare mixer with a horizontal rigid mixing drum and 5 l capacity, heated to 100° C. Within 20 minutes and with the mixer running, 1800 g POC-Na salt "A" are added to the melt as a spray-dried powder with average particle diameter of about 50 μ (corresponding to 10% coating agent in the total mix).

After completion of the POC addition, mixing is continued for yet another 15 minutes at 100° C. The suspension of the POC powder in the Japan wax melt, formed at the beginning of the POC addition and after a part of the POC quantity (about 200 g) has been added, is suddenly transformed into an easily running granulate upon further POC addition, which is preserved in fairly even outside appearance to the end of the POC addition and of the mixing process.

The product obtained represents a homogenous granulate of about 70 μ average particle diameter, except for negligible attachments on walls and blades in the mixer.

After cooling to ambient temperature, it is essentially more easily fluid than the starting product, and shows the following behavior in the hygroscopicity test:

| Percent increase in weight after 2 days at | | | |
|---|---|---|---|
| 40% rel. hum. | 65% rel. hum. | 80% rel. hum. | Fluidity limit |
| 8 | 16 | 17 | at 20% water absorption |

EXAMPLE 14

300 g of Japan wax are melted in a plowshare mixer with a horizontal rigid mixing drum and 5 l capacity, heated to 100° C. Within 20 minutes and with the mixer running, 1700 g POC-Na salt "A" are added to the melt as a spray-dried powder with an average particle diameter of about 50 μ (corresponding to 15% coating agent in the total mix).

After completion of the POC addition, mixing continues yet another 15 minutes at 100° C. The suspension of the POC powder in the Japan wax melt, formed at the beginning of the POC addition and after a part of the POC quantity (about 300 g) has been added, transforms suddenly into an easily fluid granulate upon further POC addition, which was preserved in fairly uniform outside appearance to the end of the POC addition and of the mixing process.

The product obtained represents a homogenous granulate of about 60 μ average particle diameter, except for negligible attachments on walls and blades in the mixer.

After cooling to ambient temperature, it is essentially more easily fluid than the starting product, and shows the following behavior in the hygroscopicity test:

| Percent increase in weight after 2 days at | | | |
|---|---|---|---|
| 40% rel. hum. | 65% rel. hum. | 80% rel. hum. | Fluidity limit |
| 6 | 18 | 19 | at 20% water absorption |

EXAMPLE 15

100 g Japan wax are melted in a plowshare mixer with a horizontal rigid mixing drum and 5 l capacity, heated to 100° C. Within 40 minutes and with the mixer running, 1900 g POC-Na salt "C" are added to the melt as a spray-dried powder with an average particle diameter of about 50 μ (corresponding to 5% coating agent in the total mix).

After completion of the POC addition, mixing continues yet another 20 minutes at 100° C. The suspension of the POC powder in the Japan wax melt, formed at the beginning of the POC addition and after a part of the POC quantity (about 100 g) has been added, transforms suddenly into an easily running granulate upon further POC addition, which is preserved in fairly uniform outside appearance to the end of the POC addition and of the mixing process.

The product obtained represents a homogenous granulate of about 70 μ average particle diameter, except for a negligible attachment on walls and blades in the mixer.

After cooling to ambient temperature, it is essentially more easily fluid than the starting product, and shows the following behavior in the hygroscopicity test:

| Percent increase in weight after 2 days at | | | |
|---|---|---|---|
| 40% rel. hum. | 65% rel. hum. | 80% rel. hum. | Fluidity limit |
| 6 | 11 | 12 | at 20% water absorption |

EXAMPLE 16

200 g Japan wax are melted in a plowshare mixer with a horizontal rigid mixing drum and 5 l capacity, heated to 100° C. Within 30 minutes and with the mixer running, 1800 g POC-Na salt "C" are added to the melt as a spray-dried powder with average particle diameter of about 50 μ (corresponding to 10% coating agent in the total mix.

After completion of the POC addition, mixing is continued yet another 20 minutes at 100° C. The suspension of the POC powder in the Japan wax melt, formed in the beginning of the POC addition and after a part of the POC quantity (about 200 g) has been added, is suddenly transformed into an easily fluid granulate upon further POC addition, which is preserved in fairly uniform outside appearance to the end of the POC addition and of the mixing process.

The product obtained represents a homogenous granulate of about 80 μ average particle diameter, except for negligible attachments on walls and blades in the mixer.

After cooling to ambient temperature, it is essentially more easily fluid than the starting product, and shows the following behavior in the hygroscopicity test:

| Percent increase in weight after 2 days at | | | |
|---|---|---|---|
| 40% rel. hum. | 65% rel. hum. | 80% rel. hum. | Fluidity limit |
| 4 | 12 | 14 | at 20% water absorption |

EXAMPLE 17

300 g Japan wax are melted in a plowshare mixer with a horizontal rigid mixing drum and 5 l capacity, heated to 100° C. Within 30 minutes and with the mixer running, 1700 g of POC-Na salt "C" are added to the melt as a spray-dried powder with average particle diameter of about 50 μ (corresponding to 15% coating agent in the total mix).

After completion of the POC addition, mixing is continued for yet another 10 minutes at 100° C. The suspension of the POC powder in the Japan wax melt, formed in the beginning of the POC addition and after a part of the POC quantity (about 300 g) has been added, is suddenly transformed into an easily running granulate upon further POC addition, which is preserved in fairly uniform outside appearance to the end of the POC addition and of the mixing process.

The product obtained represents a homogenous granulate of about 70 μ average particle size, except for negligible attachments on walls and blades in the mixer.

After cooling to room temperature, it is essentially more easily fluid than the starting product, and shows the following behavior in the hygroscopicity test:

| Percent increase in weight after 2 days at | | | |
|---|---|---|---|
| 40% rel. hum. | 65% rel. hum. | 80% rel. hum. | Fluidity Limit |
| 3.5 | 14 | 15 | at 20% water absorption |

EXAMPLE 18

300 g of Japan wax are melted in a plowshare mixer with a horizontal rigid mixing drum and 5 l capacity, heated to 100° C. Within 20 minutes and with the mixer running, 1700 g POC-Na salt "D" are added to the melt as spray-dried powder with an average particle diameter of about 40 μ (corresponding to 15% coating agent in the total mix).

After completion of the POC addition, mixing continues for yet another 15 minutes at 100° C. The suspension of the POC in the Japan wax melt, formed in the beginning of the POC addition and after a part of the POC quantity (about 300 g) has been added, is suddenly transformed into an easily fluid granulate upon further POC addition, which is preserved in fairly uniform outside appearance up to the end of the POC and of the mixing process.

The product obtained represents a homogenous granulate of about 80 μ average particle diameter, except for negligible attachments on walls and blades in the mixer.

After cooling to ambient temperature, it is essentially more easily fluid than the starting product, and shows the following behavior in the hygroscopicity test:

| Percent increase in weight after 2 days at | | | |
|---|---|---|---|
| 40% rel. hum. | 65% rel. hum. | 80% rel. hum. | Fluidity limit |
| 5 | 17 | 19 | at 20% water absorption |

EXAMPLE 19

200 g of stearic acid are melted in a plowshare mixer with a horizontal rigid mixing drum and 5 l capacity, heated to 90° C. Within 40 minutes and with the mixer running, 1800 g of POC-Na salt "C" are added to the melt as a spray-dried powder with average particle diameter of about 50 μ (corresponding to 10% coating agent in the total mix).

After completion of the POC addition mixing is continued for yet another 30 minutes at 90° C. The suspension of the POC powder in the fatty acid melt, formed in the beginning of the POC addition and after a part of the POC quantity (about 200 g) has been added, is suddenly transformed into an easily fluid granulate upon further POC addition, which is preserved in fairly uniform outside appearance to the end of the POC addition and of the mixing process.

The product obtained represents a homogenous granulate of about 80 μ average particle diameter, except for negligible attachments on walls and blades in the mixer.

After cooling to ambient temperature, it is essentially more easily fluid than the starting product and shows the following behavior in the hygroscopicity test:

| Percent increase in weight after 2 days at | | | |
|---|---|---|---|
| 40% rel. hum. | 65% rel. hum. | 80% rel. hum. | Fluidity limit |
| 5 | 14 | 15 | at 25% water absorption | to the melt as a spray-dried powder with an average particle diameter of about 50 μ (corresponding to 10% coating agent in the total mix).

After completion of the POC addition, mixing continues yet another 15 minutes at 100° C. The suspension of the POC powder in the fatty acid melt, formed in the beginning of the POC addition and after a part of the POC quantity (about 200 g) has been added, suddenly transforms into an easily fluid granulate upon further POC addition, which is preserved in fairly uniform outside appearance to the end of the POC addition and of the mixing process.

The product obtained represents a homogenous granulate of about 70 μ average particle diameter, except for negligible attachments on walls and blades in the mixer.

After cooling to ambient temperature, it is essentially more easily fluid than the starting product, and shows the following behavior in the hygroscopicity test:

| Percent increase in weight after 2 days at | | | |
|---|---|---|---|
| 40% rel. hum. | 65% rel. hum. | 80% rel. hum. | Fluidity limit |
| 6 | 17 | 19 | at 25% water absorption |

EXAMPLE 20

200 g of fatty sebacic acid were melted in a plowshare mixer with a horizontal rigid mixing drum and 5 l capacity, heated to 100° C. Within 30 minutes and with the mixer running, 1800 g POC-Na salt "D" are added to the melt as a spray-dried powder with an average particle diameter of about 50 μ (corresponding to 15% coating agent in the total mix).

After completion of the POC addition, mixing is continued yet another 15 minutes at 100° C. The suspension of the POC powder in the fatty acid melt, formed in the beginning of the POC addition, and after a part of the POC quantity (about 200 g) has been added, transforms suddenly into an easily fluid granulate upon further POC addition, which is preserved in fairly uniform outside appearance to the end of the POC addition and of the mixing process.

The product obtained represents a homogenous granulate of about 70 μ average particle diameter, except for negligible attachments on walls and blades in the mixer.

After cooling to ambient temperature, it is essentially more easily fluid than the starting product, and shows the following behavior in the hygroscopicity test:

| Percent increase in weight after 2 days at | | | |
|---|---|---|---|
| 40% rel. hum. | 65% rel. hum. | 80% rel. hum. | Fluidity limit |
| 5 | 15 | 17 | at 25% water absorption |

EXAMPLE 22

300 g of a fatty acid $C_{12} - C_{18}$ mixture are melted in a plowshare mixer with a horizontal rigid mixing drum and 5 l capacity, heated to 100° C. Within 18 minutes and with the mixer running, 1700 g POC-Na salt "C" are added to the melt as spray-dried powder with average particle diameter of about 50 μ (corresponding to 15% coating agent in the total mix).

After completion of the POC addition, mixing continues for yet another 15 minutes at 100° C. The suspension of the POC powder in the fatty acid melt, formed in the beginning of the POC addition and after a part of the POC quantity (about 300 g) has been added, is suddenly transformed into a easily running granulate upon further POC addition, which is preserved in fairly uniform outside appearance to the end of the POC addition and of the mixing process.

The product obtained represents a homogenous granulate of about 80 μ average particle diameter, except for negligible attachments on walls and blades in the mixer.

After cooling to ambient temperature, it is essentially more easily fluid than the starting product, and shows the following behavior in the hygroscopicity test:

| Percent increase in weight after 2 days at | | | |
|---|---|---|---|
| 40% rel. hum. | 65% rel. hum. | 80% rel. hum. | Fluidity Limit |
| 2 | 10 | 12 | at 27% water absorption |

EXAMPLE 21

200 g of fatty stearic acid are melted in a plowshare mixer with a horizontal rigid mixing drum and 5 l capacity, heated to 100° C. Within 30 minutes and with the mixer running, 1800 g POC-Na salt "C" are added

EXAMPLE 23

300 g of fatty acid $C_{12} - C_{18}$ mixture are melted in a plowshare mixer with horizontal rigid mixing drum and 5 l capacity, heated to 100° C. Over 14 minutes and with the mixer running, 1700 g of PAC-Na salt "B" are added to the melt as a spray dried powder with an average particle diameter of about 50 μ (corresponding to 15% coating agent in the total mix).

After completion of the PAC addition, mixing continues for yet another 15 minutes at 100° C. The suspension of the PAC powder in the fatty acid melt, formed in the beginning of the PAC addition and after a part of the PAC quantity (about 300 g) has been added, is suddenly transformed into an easily running granulate upon further PAC addition, which is preserved in fairly uniform outside appearance to the end of the PAC addition and of the mixing process.

The product obtained represents a homogenous granulate of about 70 μ average particle diameter, except for negligible attachments on walls and blades in the mixer.

After cooling to ambient temperature, it is essentially more easily fluid than the starting product, and shows the following behavior in the hygroscopicity test:

| Percent increase in weight after 2 days at | | | |
|---|---|---|---|
| 40% rel. hum. | 65% rel. hum. | 80% rel. hum. | Fluidity limit |
| 2 | 10 | 11 | at 28% water absorption |

Surprisingly, the process of the invention is to a high degree substrate-specific. As can easily be seen from the preceeding examples, in the case of treatment of polycarboxylates a considerable decrease in hygroscopicity occurs and, in parallel thereto, an improvement of the fluidity. If, however, any other substances known for their hygroscopicity are subjected to the same treatment, then one can neither obtain a fairly uniform granulate, nor can one observe a decrease of the hygroscopicity. This will be more clear from the following experiments.

Comparative experiment 400 g of lauric acid are added to a heatable plowshare mixer (5 l capacity; horizontal drum). The mixer is heated to 50° C. During the melting of the lauric acid the mixer is started. After the fatty acid melts entirely, over 14 minutes 1600 g of finely powdered, dry "sodium percarbonate" (=sodium carbonate - perhydrate: $Na_2CO_3 \cdot 1.5 H_2O_2$) is strewn in evenly. After completion of the percarbonate addition, mixing is continued for another 10 minutes. The preparation corresponds to 20% coating agent related to the finished mix.

Immediately after turning off the mixer, the mixture consists of exceedingly heterogenous portions, i.e, of a fine powder beside aggregations of up to 2 cm diameter. Without grinding the product (danger of destroying the coating envelopes), an exposure test is made in the conditioning cabinet at 40, 65 or 80% relative humidity of the air (20° C). (Sodium percarbonate is very well suited for such experiments since it reacts very sensitively upon contact with the humidity of the air with a spontaneous decrease of its peroxide content).

In comparison to untreated percarbonate, no positive effect could be observed on the product treated according to the process of this invention; on the contrary, the product treated with lauric acid seemed to lose its peroxide content even more quickly.

Comparative experiment 2

Analogously to comparative experiment 1, another per - compound, namely a mixture of 50% $KHSO_5$, 25% $KHSO_4$ and 25% $K_2SO_4$, is treated with lauric acid (again 20% coating agent in the final mixture).

In that case too, formation of lumps took place in the mixer, and no positive coating effect could be achieved.

Comparative experiment 3

150 g of stearic acid are added to a heatable plowshare mixer (5 l capacity; horizontal drum). The mixer is heated to 90° C. During melting of the stearic acid, the mixer is started. After the fatty acid melts completely, 350 g of a finely powdered, dry choline-hydrochloride is strewn in evenly within 20 minutes. After completion of the choline-hydrochloride addition, mixing is continued for another 15 minutes. The preparation corresponds to 30% coating agent, related to the finished mixture.

Shortly after the beginning of the choline-hydrochloride addition, the mixer begins to grind audibly, and even larger aggregations of the mixed substances are built up in the mixer. At the end of the mixing process, the mixed material comprises a mixture of a more or less crumbly mass with lumps up to 2 cm in diameter. There is no trace of a homogenous, fluid, mixed material. Even after cooling (in a plastic bag closed in an air tight manner) the mixed material could not be designated under any circumstances as a fluid powder, but it acted rather like a lumpy crystallized sugar that had become moist.

In the hygroscopy test, both the untreated product as well as the product treated according to the above-described process had already deliquesced after about 6 hours at a relative humidity of the air of only 65% (20° C); at 80% relative humidity of the air there were even drops of water above the deliquesced product.

What is claimed is:

1. A process for decreasing the hygroscopicity of a polycarboxylate, said process comprising:
   A. preparing a melt of a composition having a melting point of about 40°–120° C, said composition giving an acid or neutral pH in an aqueous solution or suspension, said composition being less hygroscopic than said polycarboxylate, said composition capable of being free flowing under equilibrium conditions at about 30° C in an air atmosphere of at least about 40% relative humidity;
   B. heating said melt in a mixer to a temperature of up to about 140° C;
   C. gradually adding said polycarboxylate as a powder to said melt while mixing said melt, said polycarboxylate having an average degree of polymerization between about 5 and about 500 and comprised of:
      1. Y + W/2 basic mole percent of units of the formula

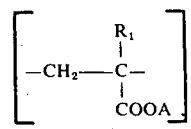

2. U-W basic mole percent of units of the formula

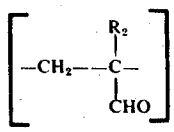

3. Z basic mole percent of units of the formula

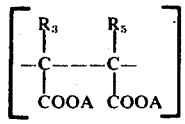

4. W/2 basic mole percent of units of the formula

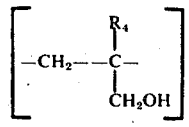

5. V basic mole percent of units of the formula

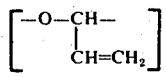

wherein U equals 12 to 47; V equals 1 to 25; W equals zero to U; Y equals 100—(U+V+Z); and Z equals 0 to 20; A is an alkali metal, hydrogen or ammonium ion; $R_1$ signifies hydrogen, methyl, hydroxymethyl, ethyl, chlorine or bromine; $R_2$ and $R_4$ are the same or different and signify hydrogen or hydroxymethyl; $R_3$ and $R_5$ are the same or different and signify hydrogen, methyl or ethyl; and whereby it must be fulfilled as a marginal condition, that for W unequal to zero, the quotient of basic mole percent carboxyl or carboxylate groups to basic mole percent hydroxyl groups lies between about 2 and about 16;

D. mixing the product of step (C) for about 10 minutes to about 1 hour at a temperature between the melting point of said composition and about 140° C;

wherein said composition comprises at least about 3% and at most about 40% by weight of the mixture resulting after all polycarboxylate has been added to said melt;

and further wherein said composition is selected from the group consisting of $C_{16}$–$C_{22}$ monocarboxylic acids; aliphatic dicarboxylic acids; acid anhydrides; monovalent alcohols; polyvinyl alcohols; paraffin; esters; fatty acid-polyglycol ether; polyether; and mixtures thereof.

2. A process according to claim 1 in which said composition is capable of remaining free flowing under equilibrium conditions in an air atmosphere of at least about 80% relative humidity.

3. A process according to claim 1 in which said composition is capable of remaining free flowing under equilibrium conditions in an air atmosphere of at least about 90% relative humidity.

4. A process according to claim 1 in which the composition comprises about 5–30% by weight of the resulting mixture.

5. A process according to claim 1 in which the composition comprises about 5–15% by weight of the resulting mixture.

6. A process according to claim 1 in which the polycarboxylate is added to the melt within about 5 to about 10 minutes.

7. A process according to claim 1 in which the total mixing time is about 15 minutes to about 5 hours measured from the time of first addition of polycarboxylate to the mixer.

8. A process according to claim 1 in which the total mixing time is about 20 minutes to about 1 hour measured from the time of first addition of polycarboxylate to the mixer.

* * * * *